(12) United States Patent
Dolgoff

(10) Patent No.: US 7,365,908 B2
(45) Date of Patent: Apr. 29, 2008

(54) TILING OF PANELS FOR MULTIPLE-IMAGE DISPLAYS

(76) Inventor: Eugene Dolgoff, 139 Linden Ave., Westbury, NY (US) 11590

( * ) Notice: Subject to any disclaimer, the term of this patent is extended or adjusted under 35 U.S.C. 154(b) by 0 days.

(21) Appl. No.: 10/291,811

(22) Filed: Nov. 8, 2002

(65) Prior Publication Data

US 2003/0107804 A1    Jun. 12, 2003

Related U.S. Application Data

(60) Provisional application No. 60/345,907, filed on Nov. 8, 2001.

(51) Int. Cl.
*G02B 27/22* (2006.01)
*G02B 27/10* (2006.01)

(52) U.S. Cl. .................... 359/463; 359/619

(58) Field of Classification Search ............... 359/462, 359/463, 464, 466, 619; 348/54, 59, 52, 348/53, 51, 383; 349/15; 351/240; 345/543; 40/624

See application file for complete search history.

(56) References Cited

U.S. PATENT DOCUMENTS

| | | | | |
|---|---|---|---|---|
| 5,528,420 A | * | 6/1996 | Momochi | 359/463 |
| 6,046,848 A | * | 4/2000 | Gulick, Jr. | 359/463 |
| 6,118,584 A | * | 9/2000 | Van Berkel et al. | 359/463 |
| 6,302,541 B1 | * | 10/2001 | Grossmann | 351/240 |
| 6,553,699 B2 | * | 4/2003 | Edmunds et al. | 40/624 |
| 2001/0050686 A1 | * | 12/2001 | Allen | 345/543 |

\* cited by examiner

*Primary Examiner*—Audrey Chang
(74) *Attorney, Agent, or Firm*—Garry J. Elman; Elman Technology Law, P.C.

(57) ABSTRACT

A large-area display is composed of two or more adjacent panels, in which the overall display provides a consistent perception of depth (and/or other characteristics of the images) in all panels from each viewing position. This is accomplished by generating a first panel having a first repeating pattern in an arrangement of successive segments of the images, and generating a second panel to be displayed adjacent to the first panel, the second panel having a second repeating pattern in an arrangement of successive segments of the images that are in the same order as the first repeating pattern but starting at a different element of the repeating pattern from the first element of the first repeating pattern, and assembling the panels adjacent to each other, thereby allowing corresponding images to be displayed on the adjacent panels when viewed from a range of various view points.

14 Claims, 8 Drawing Sheets

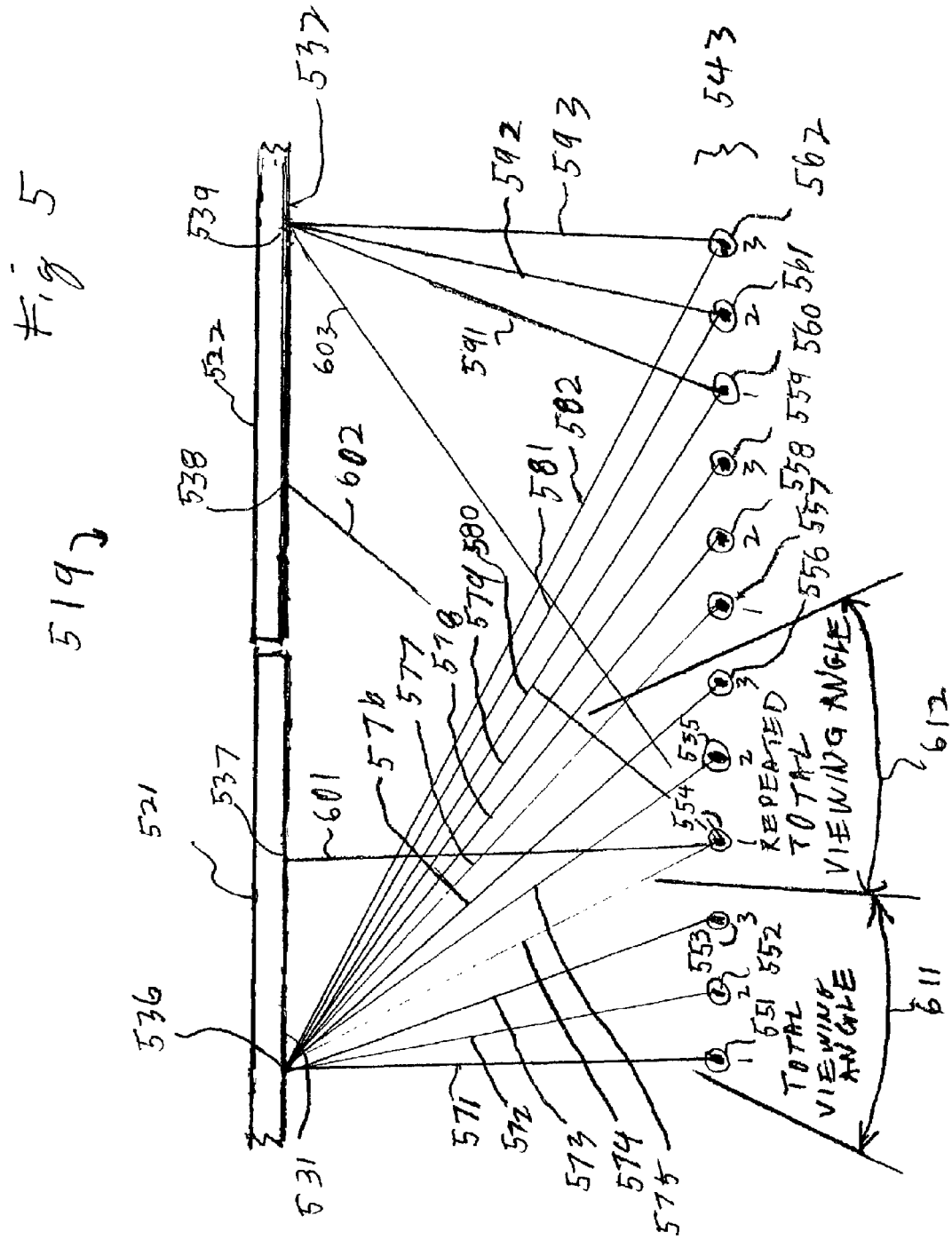

TILING OF PANELS FOR MULTIPLE-IMAGE DISPLAYS

CROSS-REFERENCE TO RELATED APPLICATION

This application claims benefit of U.S. Provisional Patent Application 60/345,907, filed Nov. 8, 2001, the entire disclosure of which is incorporated herein by reference.

BACKGROUND OF THE INVENTION

The present invention relates to systems for displaying multiple images, including elements of three-dimensional images, images representing successive positions of moving objects, and/or multiple individual images, each of the multiple images being viewable to the exclusion of others from a specific position with respect to the display. More particularly the invention relates to providing a large-area display composed of two or more adjacent panels, in which the overall display provides a consistent perception of depth (and/or other characteristics of the images) in all panels from each viewing position.

Lenticular, parallax barrier, and similar displays of panels providing 3D or motion effects are becoming increasingly popular, but their size has been limited by the dimensions in which a single panel can be practically manufactured and shipped, for example 4 feet by 8 feet. It is desirable to mount two or more panels adjacent to each other to assemble a large-area display, each panel showing a respective part of an overall image. But typically when such panels are manufactured and then placed in abutment, at the joint there appears to be a "shift" in the observed image that detracts from its apparent realism or other desired effect.

SUMMARY OF THE INVENTION

According to one aspect of the present invention, a multi-image display is assembled from a plurality of panels. Each of the panels includes a lens for displaying in varying directions a plurality of images generated from multiple image elements interlaced in a sequential repeating pattern. In accordance with the invention, each of the panels has a sequential repeating pattern of interlaced image elements, but for each of any two horizontally-adjacent panels, the sequence starts at a different image element in the sequence with respect to the lenticules of the lenticular lens sheet or other image-directing device, thereby adjusting the images being displayed on the adjacent panels to a common set of view points. The image-directing device can be a lenticular array or screen, a parallax barrier, or any other device which permits viewing of the separate images.

In accordance with a particular aspect of the invention, a 3D display is presented from the multiple panels, and the image-directing device presents one or more autostereoscopic images.

The present invention provides improved apparatus and methods for displaying images that are different when viewed from different positions in space. For example, lenticular techniques typically use arrays of cylindrical lenslets (i.e. lenticules) to present one of a plurality of images to a first view point (e.g. the eye of an observer), and a different one of the plurality of images to a second view point at a different location, displaced angularly from the position of the first view point. Where the first and second view points are the two eyes of an individual observer, and the images are members of a stereo pair, binocular fusion by the individual results in the perception of a scene having depth. The present invention may also be used to provide improved autostereoscopic large-area displays using other image-directing techniques including parallax barrier and integral imaging techniques. Furthermore, the present invention may be used with imaging systems wherein the multiple images are viewed sequentially and represent motion, or for the presentation of a succession of different images, each of the images being viewable from one of a plurality of view points with respect to the display device.

The invention is particularly useful for autostereoscopic displays which use a single display to provide different images to an observer's left and right eyes. In a typical system, an autostereoscopic display uses a vertically-oriented lenticular lens sheet to display two or more images as viewed from different directions, with the intent that a viewer will see one of these images through each eye, as right- and left-eye images. As will be described, the lenticular lens or other image-separation device is overlaid on a viewing surface with multiple interlaced images.

BRIEF DESCRIPTION OF THE DRAWINGS

FIG. 5 is a diagrammatic view of a display consisting of two adjacent panels using lenticular image-directing devices with respect to multiple view points.

DETAILED DESCRIPTION

Figure 1:
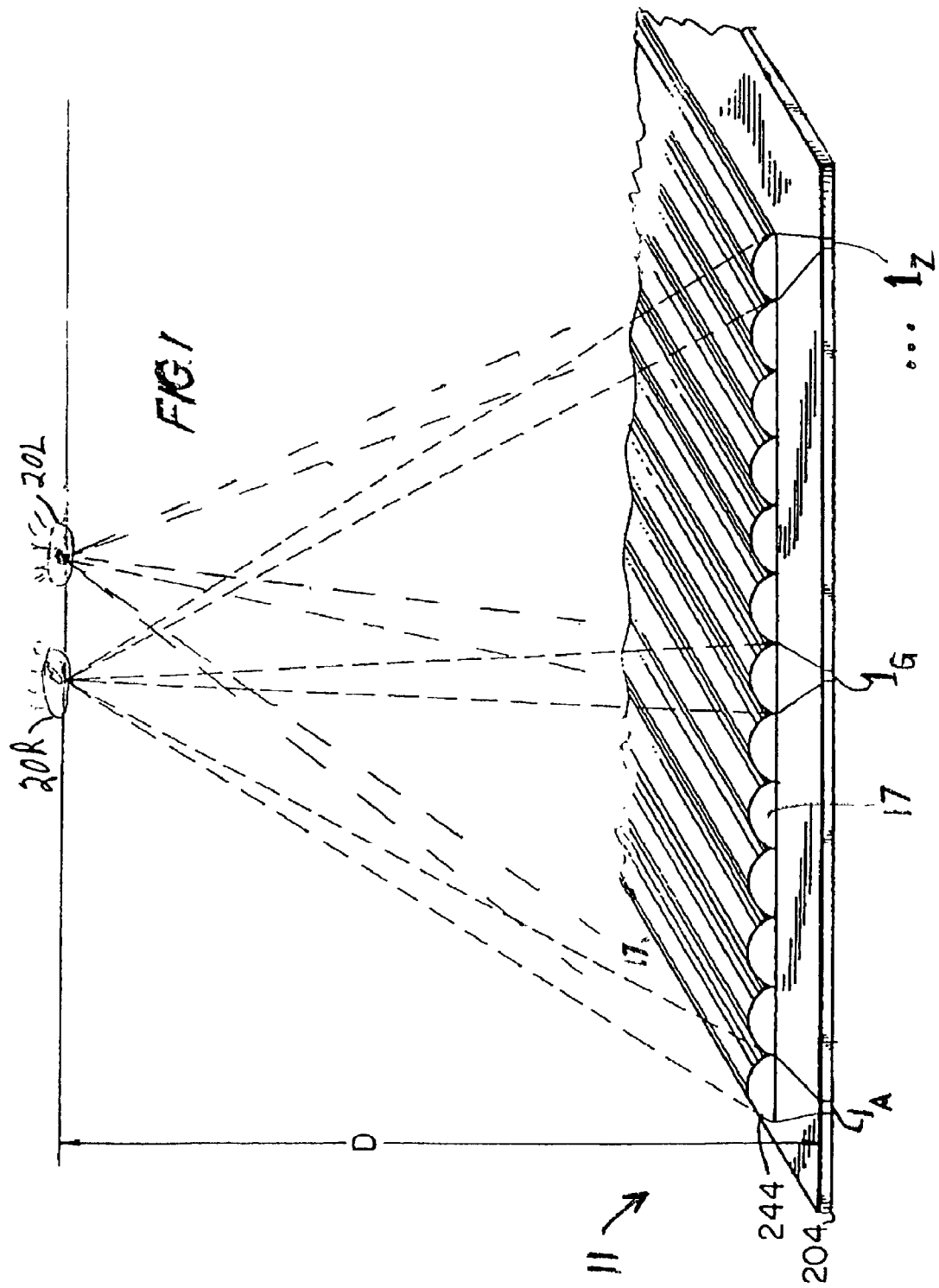
FIG. 1 is a diagrammatic perspective view of a display arrangement in which a lenticular lens screen allows viewing of multiple images on a single image medium, e.g. photographic emulsion, from multiple view points.

The media in a display to be tiled includes multiple sets of pictures or image sets, each with a large amount of image data having a large amount of data points in space. When a picture with the large amount of image data is present, all of the image data in the form of light seen by one eye should belong to the same view. When multiple panels are used, and the multiple panels are separately produced, the image data from the different panels viewed from a single view point would tend to come from different views (i.e. different images). This is because of the difference in the image sets presented when observed from different viewing locations.

The image sets on the different tiles or panels would therefore be different when viewed from a common position. Each panel will present a particular image x when each panel is viewed separately from the same given angle with respect to each panel. However, when two adjacent panels are being viewed, each panel will be seen from a different angle. Thus one panel will not present image x when the other does.

The image data from each panel is presented as a large number of image points in space. When two images are presented, the corresponding image points in space do not coincide, and so the viewer sees two different images when looking at two different panels.

When an image extends across two or more panels, the image points going into one eye from both panels should belong to the same view. If one simply makes two pictures, one at a time for each panel, when the two panels are put together, generally the observer sees one picture on one panel shifted over with respect to the other picture on the other panel. As a result, the two tiled panels will not send data to the observer's eye corresponding to the same view.

In order to solve this problem, the present invention provides that the data in the panels are rearranged with respect to the lenticules or other image-separating device, by rearranging the order of the data in the pictures on the adjacent panels, or by shifting the position of the lenticules with respect to a source of interlaced image segments (or both). The rearrangement of the data is done so that from one view point (i.e. from one eye position) the observer is getting all of the data received from all of the image segments corresponding to one point of view. The rearrangement is such that from any one viewing point at or near the viewing distance for which the display is designed, one sees all of the data from the same view.

An autostereoscopic image can be provided on a surface as a plurality of image segments. The image segments are then viewed or otherwise displayed separately. This results in the viewing of two or more different images, with respective ones of any two images seen through an observer's left and right eyes. In a typical system, an autostereoscopic display uses a lenticular lens over an image medium to display plural images in different directions. The display in different directions results in the observer seeing different images in each eye.

Where the invention is applied to a lenticular lens screen, the screen is overlaid on the viewing surface to direct images under different parts of each lenticule in a different direction. Alternatively to printed or photographic media, it is possible to use video image information behind the lenticular lens, e.g. to provide the images on a CRT, LCD, projection screen or other display device.

Autostereoscopy directs the corresponding images to the eye without the use of any optical device near the person. Instead, optics are located near the images, restricting the angle of view of each image so that each eye still sees only one of the images. This has been done with lenses, prisms, and light-blocking barriers, for instance. Since the angle of view for each image can be made very narrow, many images can be taken from many angles and viewed one at a time as one moves one's head. This provides an aspect of 3-D perception, called motion parallax, not available from conventional stereoscopy. With motion parallax, one can look around foreground objects to see previously hidden background objects.

When the two eyes receive different views of a scene, the brain overlaps them, trying to line the images up exactly; however, two different images viewed from two different angles cannot line up exactly. This binocular disparity gives the brain information about the distance to an object being viewed, that is, its depth with respect to the observer. It is advantageous that the left image and right image be consistent across a display. This presents a consistency in viewing the appropriate image across the display and enhances the stereoscopic effect as well as the continuity of the scene in general. The ability of the mind to construct the three dimensionality is supported by such consistency within the image.

In the case of lenticular lens images, the image consists of plural images segmented along vertical lines. The image is directed through the lenticules so that different image segments are directed to different viewing locations.

In the production of conventional two-dimensional large-area display images, the image is often provided as a tiled array of smaller images. This allows production of the images at a more manageable size, while providing the desired display size. In the case of large-area autostereoscopic displays, the tiling must preserve the autostereoscopic data in the correct order from tile to tile. Each tile can include the use of vertical bands or other image segments, which are generally provided in a regular pattern across any given tile. The autostereoscopic data can include two or more images (here represented by the numbers 1, 2, etc.) providing one or more image pairs when viewed from different points. The images can be provided on printed media (e.g. lithographic, laser print, inkjet print), photographic print media, video, etc.

More generally, when multiple images are provided as interlaced vertical stripes or slices, the images are provided in a sequence of 1 . . . x images. The number represented by x may be as small as two (wherein just two images are provided) or as high as permitted by the resolution of the image medium and the width of a lenticule. Typical values for x range from 3 to 30.

According to the prior art, where a second tile continues the image of a first tile adjacent thereto, the order of presentation of the interlaced vertical stripes would be done in a manner which is presumed to continue the 1-2-3 . . . x sequence, starting again with image 1.

According to one aspect of the present invention, a large-size image array for viewing through a lenticular lens sheet is provided as a sequence of multiple images sliced into segments and interlaced in a predetermined order. Multiple panels or tiles are used to expand the area of the image displayed beyond that economical or otherwise convenient for production on a single panel or tile.

The order of the interlaced segments as laid down on the image medium for a first tile panel is in a regular pattern, such as 1-2-3-4-5-6-1-2-3-4-5-6-1-2-3-4-5-6 on the last lenticule. This sequence exemplifies the case where x=6, but it is to be understood that x may be any of various numbers as previously stated. If each lenticule is represented by a letter and each of the image segments associated with that lenticule is identified with that letter as a subscript, then the order of segments is represented as $1_A\text{-}2_A\text{-}3_A\text{-}4_A\text{-}5_A\text{-}6_A\text{-}1_B\text{-}2_B\text{-}3_B\text{-}4_B\text{-}5_B$ $\text{-}6_B\text{-}1_C\text{-}2_C\text{-}3_C\text{-}4_C\text{-}5_C\text{-}6_C\text{-}1_D\text{-}2_D\text{-}3_D\text{-}4_D$ $\text{-}5_D\text{-}6_D$ . . . and so on, until ending with the lenticule identified arbitrarily as Z for the last lenticule of the tile, with its image segments being called: $1_Z\text{-}2_Z\text{-}3_Z\text{-}4_Z\text{-}5_Z\text{-}6_Z$ As illustrated, the leftmost edge of the second tile panel is intended to abut the rightmost edge of the first tile panel. In accordance with the prior art, one would generate an interlaced sequence of multiple image slices in the same order and starting with the same image as with the first panel. Thus, where the first lenticule of the second panel is AA, and the second lenticule of the second panel is BB, and so on, the prior art sequence of image elements would be $1_{AA}\text{-}2_{AA}\text{-}3_{AA}\text{-}4_{AA}\text{-}5_{AA}\text{-}6_{AA}\text{-}1_{BB}\text{-}2_{BB}\text{-}3_{BB}\text{-}4_{BB}\text{-}5_{BB}\text{-}6_{BB}\text{-}1_{CC}\text{-}2_{CC}\text{-}3_{CC}\text{-}4_{CC}\text{-}5_{CC}\text{-}6_{CC}\text{-}1_{DD}\text{-}2_{DD}\text{-}3_{DD}\text{-}4_{DD}\text{-}5_{DD}\text{-}6_{DD}\ldots$ and so on, until ending with the lenticule identified arbitrarily as zz for the last lenticule of the tile, with its image segments being called: $1_{ZZ}\text{-}2_{ZZ}\text{-}3_{ZZ}\text{-}4_{ZZ}\text{-}5_{ZZ}\text{-}6_{ZZ}$ In accordance with the present invention, the order of segments on the second tile, which is intended to abut the right edge of the first tile, would also be in the same sequence of 1-2-3-4-5-6-1-2-3-4-5-6-1-2-3-4-5 -6 and so on, but under each lenticule, the sequence would start at a different image number, offset from the first image by a difference which may be empirically determined or calculated if desired. This is accomplished by adjusting the relative position of the image segments (or appropriately realigning the image-bearing media) with respect to the lenticules or other image-directing device. This adjustment may be done by shifting the image segments with respect to the lenticules or other image directing device an amount that is a whole number (integer) of the segment widths or by an amount which is a real number (i.e. an integer plus a fraction less than one) of image segment widths.

For example, for a particular three-panel display with each panel being 4 ft. high and 3 ft. wide, using 30 images and lenticular lens sheets having a 25-degree angle of view and an optimum viewing distance of 12 ft., it was empirically found that an offset of 3 to 4 image segment widths was optimal to provide the observer with perception of a single 9-ft.-wide image without unintended breaks or other discontinuities at the junctions.

In accordance with a further aspect of the invention, when the desired amount of offset is other than an integer, the position of the image-directing device is shifted laterally with respect to the image segments on the image-bearing medium to achieve a shift that includes a fraction of the width of an image segment. That is, to achieve a shift that is the width of 3½ image segments, one embodiment of the invention would involve generating a new image that starts three segments away from segment 1, namely at segment 4, and then physically positioning the image-bearing medium shifted forward by an additional ½ segment with respect to the lenticular lens sheet or other image-directing device. Another way to create the 3½-segment shift of this example in accordance with the invention would involve generating a new image that starts four segments away from segment 1, namely at segment 5, and then shifting the image-bearing medium backwards with respect to the image-directing device by ½ segment. Yet another embodiment would involve using a conventionally generated image-bearing medium, but shifting it forwards by the width of 3½ segments with respect to the image-directing device. Other embodiments would achieve effects similar to the aforesaid by shifting the position of the image on the image-bearing medium, instead of physically shifting the medium itself.

The appropriate amount of shifting for a particular set of images may be determined empirically. For example, a first panel is assembled, as by laminating a first image-bearing medium onto a surface of a first lenticular lens sheet, and is then fixed in place. A second image-bearing medium is then fixed in place coplanar with and adjacent the first panel. A second lenticular lens sheet is movably positioned over the second image-bearing medium and is observed from the desired viewing distance by a stationary viewer (e.g a camera or an individual looking through one eye). If the image observed by the viewer from the first panel matches the image observed by the viewer through the second lenticular lens sheet, then a second panel is assembled by laminating the second lenticular lens sheet to the second image-bearing medium at precisely that location. However, if, as often occurs, the image observed by the viewer from the first panel fails to match the image observed by the viewer through the second lenticular lens sheet, then in accordance with the invention, the second lenticular lens sheet is shifted laterally (i.e. the lenses and data lines are always parallel) with respect to the second image-bearing medium. This may be performed by shifting the lens sheet or the medium, or both. The shifting is stopped when the viewer observes that the image seen on the first panel matches the image seen through the second lens sheet, and the second lens sheet is laminated or otherwise affixed to the second image-bearing medium in precisely that relationship. And so on for succeeding panels.

For some uses of the present invention, it is immediately apparent from the images themselves that the image on the first panel matches that which is seen through the second lens sheet, e.g. often when computer-interlaced images are used. However, in accordance with a further aspect of the invention, it is frequently desirable, especially for a moving or 3D image, to produce in the margin of each of the panels an "alignment bar" in the form of a narrow strip extending horizontally across a portion or the entire length of each of the panels. The alignment bar is generated such that each image in the series of images is associated with a unique identifier. The identifier may be a numeral, e.g. 1, 2, 3, 4, 5, etc., or a color, e.g. red, yellow, green, blue, violet, black, etc., or some other element that is readily distinguishable visually from corresponding identifiers on the alignment bar for other images in the series.

Figure 7A:
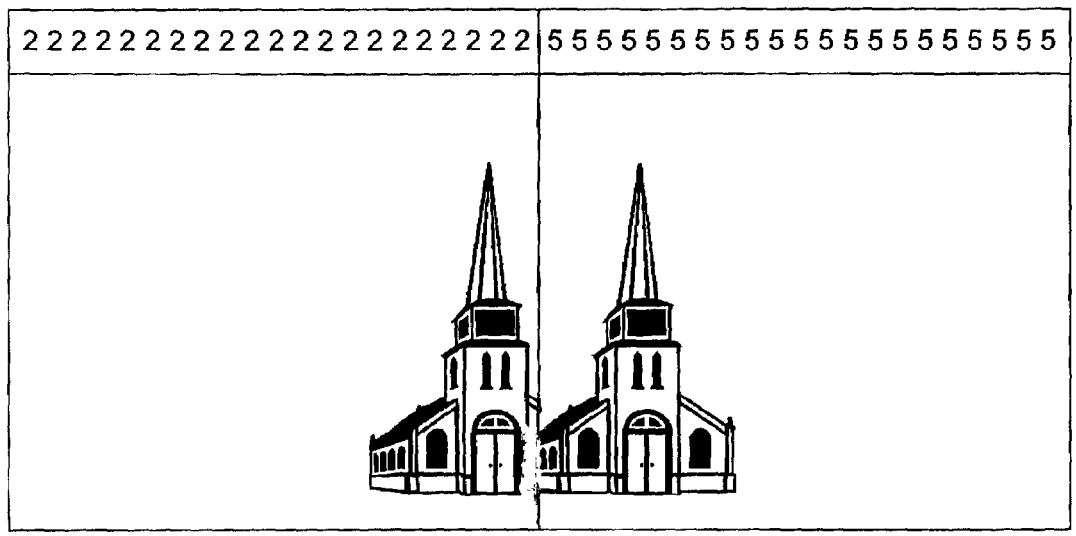
FIG. 7A is a diagrammatic representation of a two-panel display, the elements of the second panel not yet being laminated so as to permit alignment in accordance with the invention.
Figure 7B:
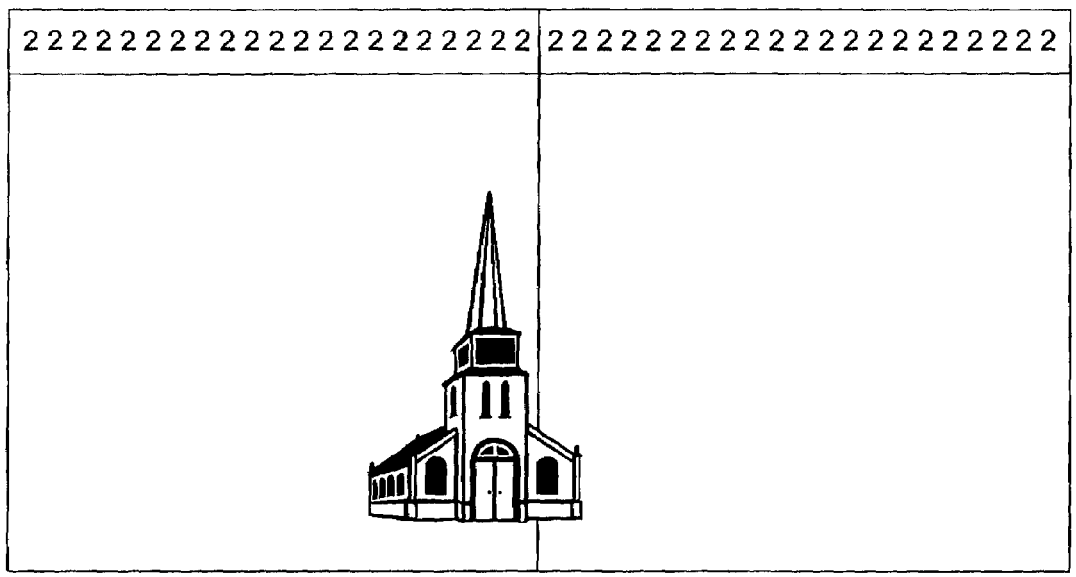
FIG. 7B is a diagrammatic representation of the two-panel display of FIG. 7A, the elements of the second panel having been aligned in accordance with the invention and being ready for lamination.

Thus, as shown in FIG. 7A, if numeric identifiers are used in an alignment bar across the top of a multiple-panel display, and in accordance with the afore-described alignment procedure, the viewer looks at the first panel and sees the number 2 at the position of the alignment bar near the edge in question, and immediately looks at the second lens sheet and sees the number 5 at the position of the alignment bar near the same edge, it is apparent that the second lens sheet needs to be shifted with respect to the image medium to create the desired alignment. In accordance with the invention, when such shifting results in the number 2 being seen through the second lens sheet, as shown in FIG. 7B, the shifting is stopped and the lens sheet is laminated or otherwise affixed to the image-bearing medium.

Using customary digital cameras and optical recognition software, along with servo-motors to effect the aforementioned shifting, the foregoing process is desirably automated.

An alternative embodiment of the invention is applied when each of a plurality of images is projected from each of multiple vantage points through the lenticular lens sheet, effecting conventional optical interlacing. In accordance with the invention, when the series of images on the second image-bearing medium is exposed, the sequence of the slides projected through the lenticular lens sheet is shifted so as to shift the location of the recorded image segments as described herein.

In accordance with the present invention, to calculate the desired shift in the view, one determines the angle that an observer would traverse to view the entire set of images behind one viewing element, called the viewing angle. The viewing angle is then divided by the number of images to provide the angle per image. Thus if the viewing angle is 24 degrees and there are 6 images, the angle per image is 4 degrees/image.

One would either use standard optical equations to calculate the viewing angle of the lenticular lens, based on its radius of curvature, its width and its refractive index, or its f-number, or would determine the viewing angle empirically. Given the viewing angle and the number of images to be used, one then calculates the angular subtense of each image and its location in space. One also identifies the viewing distance, which is a matter of choice by the designer when the image is recorded. Given these parameters, one calculates the width of the view for the particular lens. Once this is known, the locations of the viewing points for each image are derived, as the angle between each new image (view) is known.

Next one draws (or equivalently calculates) a diagram showing the first and second panels. One then selects a view point V1 where the observer should be seeing a first portion of image 1 on the first panel and the second portion of image 1 on the second panel. One calculates which image on the second panel is actually seen from the selected view point V1. Generally it is not image 1, but some other image N. This provides the amount of segments which must be offset N to be applied to correct for this disparity, namely N minus 1.

FIG. 1 shows a single-panel lenticular display arrangement 11. A lenticular lens screen 244 is used to display multiple images from a single image medium 204. In generating the image medium 204 from multiple images from their individual sources, each image has been broken up into a series of linear elements or segments, here expressed as $1_A$, $1_G$, and $1_Z$. It is to be understood that each lenticule has a corresponding linear image element under it, though not shown here to provide clarity of illustration. Sequential portions of each of the multiple images appears in a regular fashion beneath a predetermined part of sequential ones of the lenticules 17 which make up the lenticular lens screen 244.

In that manner, multiple images are provided on a single image medium. The image medium contains a sequence of multiple interlaced images. When the images are intended for stereoscopic viewing, the interlaced linear image elements are provided as vertical stripes or bands, since human binocular eyesight is across a horizontal plane.

In order to achieve an autostereoscopic effect, at least two sets of image segments from the interlaced images are provided on a viewing plane, corresponding to viewing of a left image and a right image. If the viewing plane is a video source, movement is achieved by changing the images. In the case of fixed media, it is common to use more than two sets of interlaced images. The use of more than two sets of interlaced images makes it possible to represent movement because not only does the image change from left eye 20L to right eye 20R, but also the image changes to another set of images with a small amount of relative movement of the observer.

Figure 2:
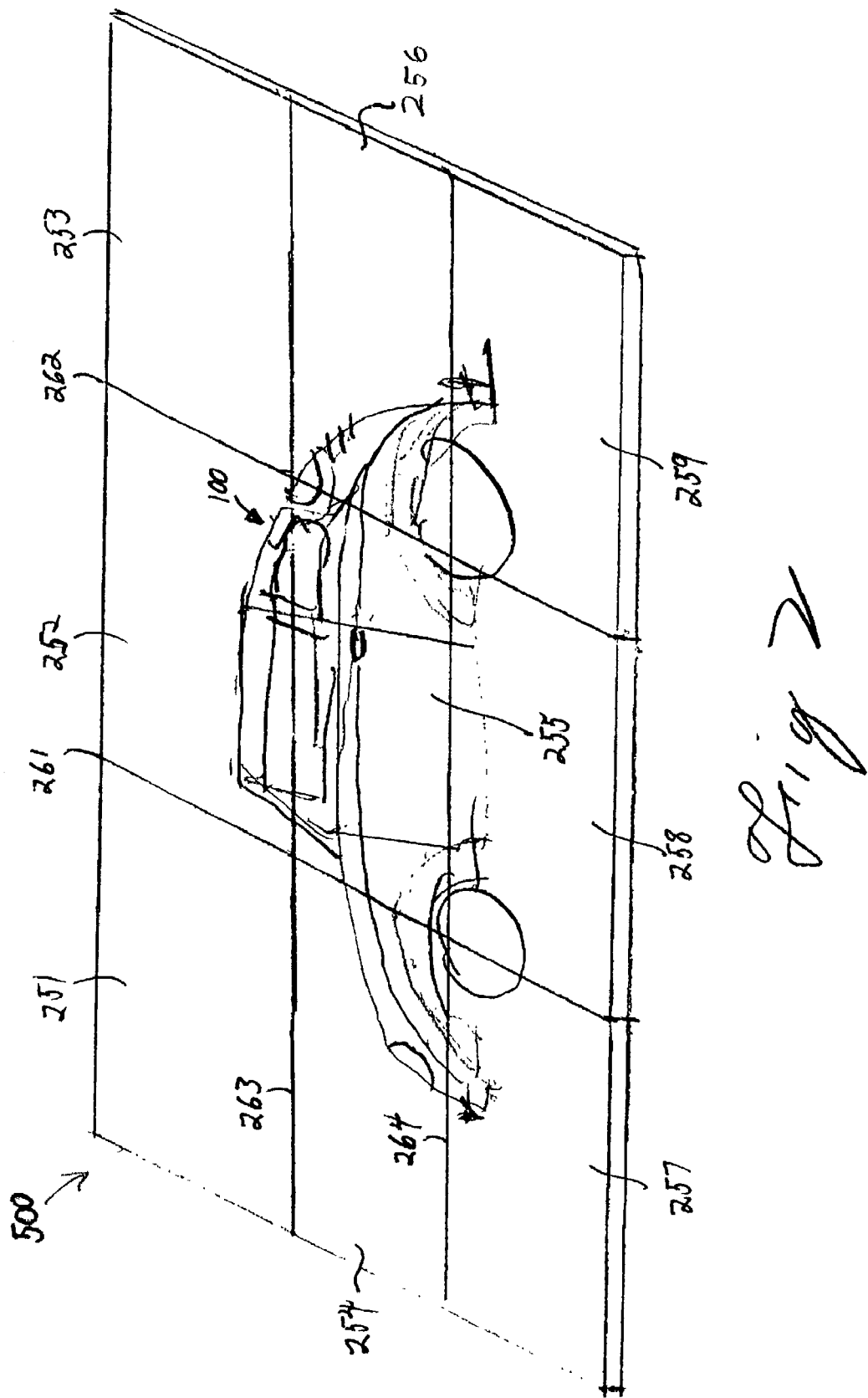
FIG. 2 is a perspective view of a large-area display of the present invention in which nine abutting panels or tiles form a display having an area which is larger than would be achieved with one panel or tile.

FIG. 2 shows a large-area image-display device 500 of the present invention having nine panels 251, 252, 253, 254, 255, 256 257, 258, 259. As shown the viewer sees an image of an automobile 100 having parts of the image appearing on panels 252, 254, 255, 256, 257, 258, and 259. Each panel also contains some background data, and panels 251 and 253 represent only background.

Note that panels 251 and 252 abut at vertical junction 261, as do also panels 254, 255, and also panels 257, 258. In accordance with the invention, an offset of the image element sequence is implemented in accordance with the present invention to minimize the sense of skip or break at the junction 261.

Similarly, panels 252 and 253 abut at vertical junction 262, as do also panels 255, 256, and also panels 258, 259. Similarly an offset in image sequence is implemented in accordance with the present invention to minimize the perception of skip or break at junction 262.

Panels 251 and 254 abut at horizontal junction 263, as do also panels 252, 255 and panels 253, 256. Similarly panels 254 and 257 abut at horizontal junction 264, as do also panels 255, 258 and 256, 259. Because the lenticular lens sheets on each panel have vertical lenticules, there is no adjustment needed in accordance with the present invention to improve the image at these junctions.

Alternatively, if the lenticular lens sheets making up the large-area display 500 of FIG. 2 were to be oriented horizontally, e.g. to generate a sense of movement rather than a 3-D effect, then the adjustment of the present invention would be applied to horizontal junctions 263 and 264 rather than to vertical junctions 261 and 262.

If the lenticular lens sheets making up the large-area display 500 were oriented other than horizontally or vertically, or if the display were to use integral imaging techniques (with parallax in both directions), then it would be advantageous to provide the offset taught herein to horizontal and vertical junctions.

Figure 3:
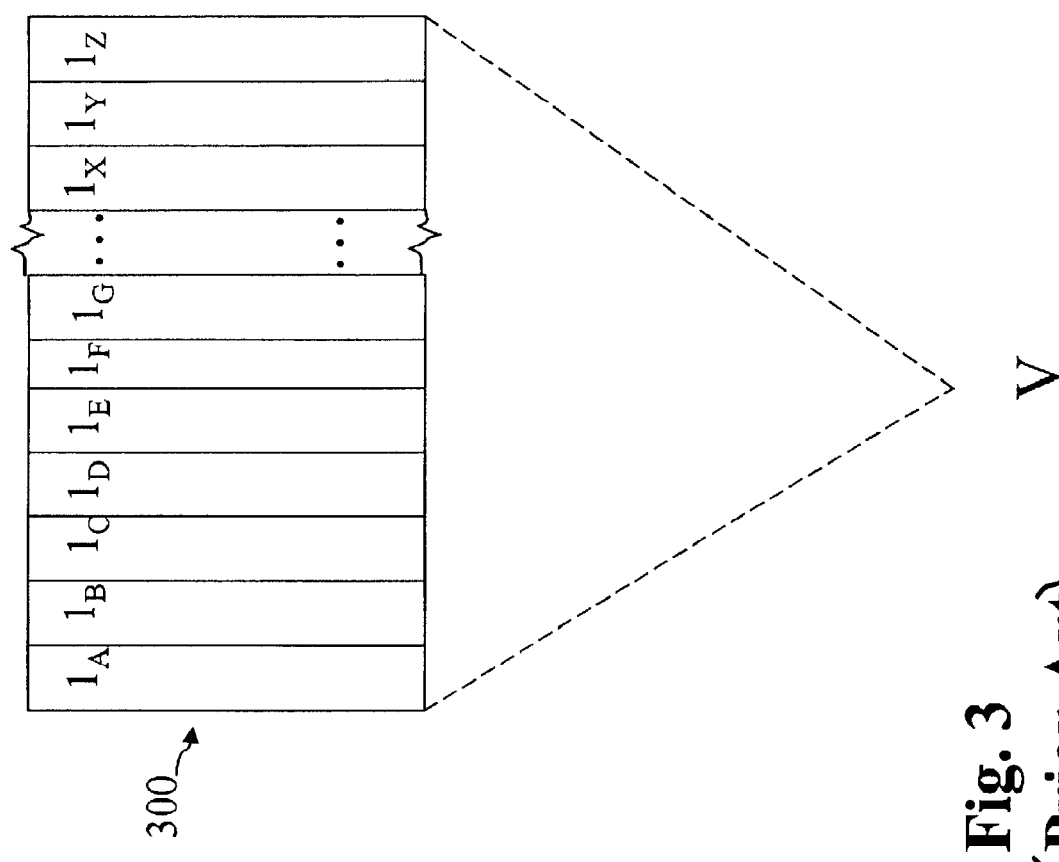
FIG. 3 is a diagrammatic representation of a prior art single-panel lenticular autostereogram.

FIG. 3 (prior art) is a representation of a single-panel autostereoscopic lenticular display as seen by the left eye of an observer at view point V. The observer would view image 1 made up of a multiplicity of vertical slices viewed through vertical lenticules, namely $1_A$-$1_B$-$1_C$-$1_D$-$1_E$-$1_F$-$1_G$ . . . $1_X$-$1_Y$-$1_Z$ Assuming that the lenticular lens sheet does not introduce significant distortion, together the vertical slices would be perceived as a single, uninterrupted image 1. The view through the observer's right eye (not shown) would typically show an image 2 formed of a multiplicity of vertical slices, and the observer's brain would generally fuse images 1 and 2 to cause perception of a single overall 3-D image.

Figure 4A:
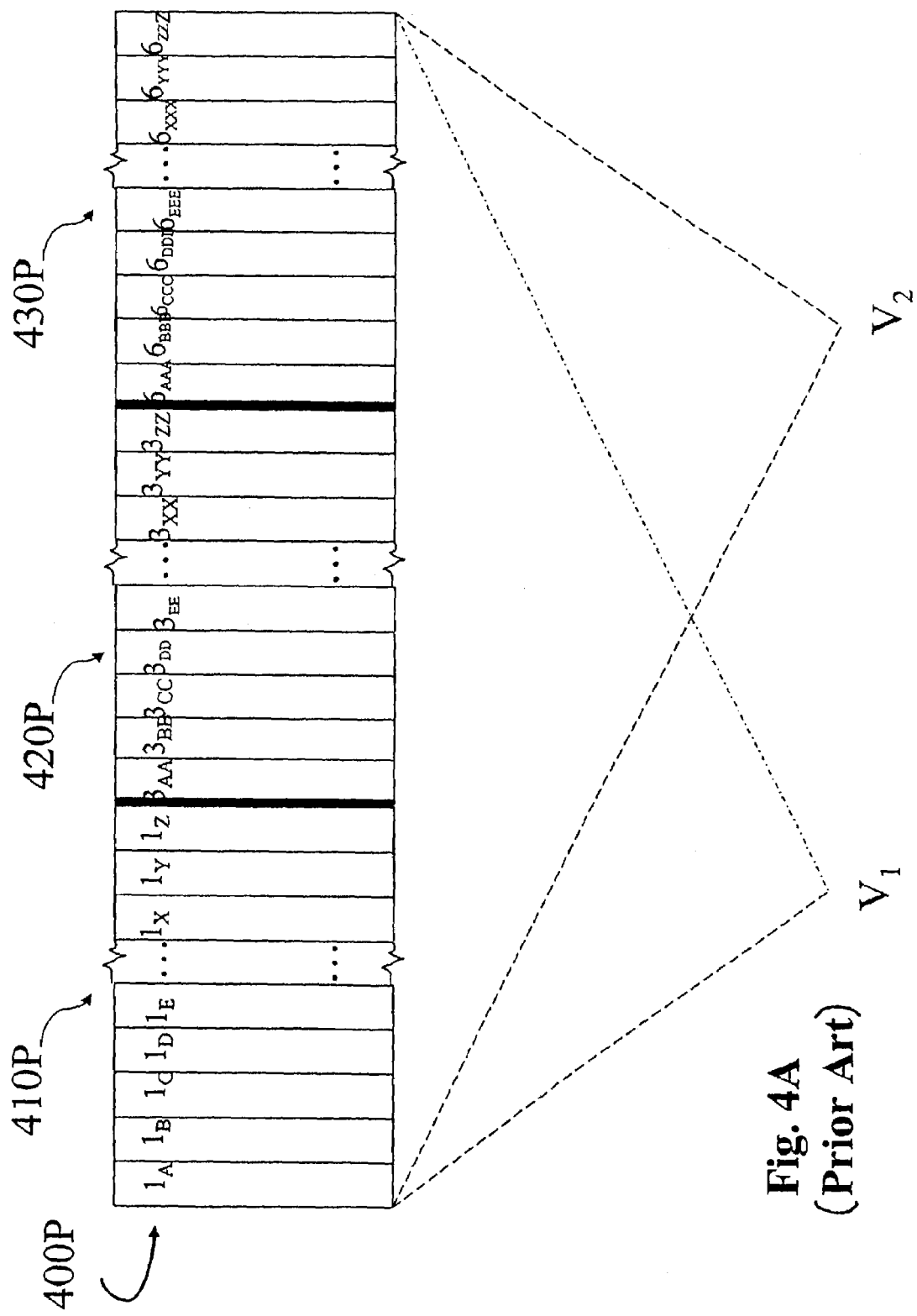
FIG. 4A is a diagrammatic representation of a three-panel display, showing what would be viewed in accordance with the prior art (400P).
Figure 4B:
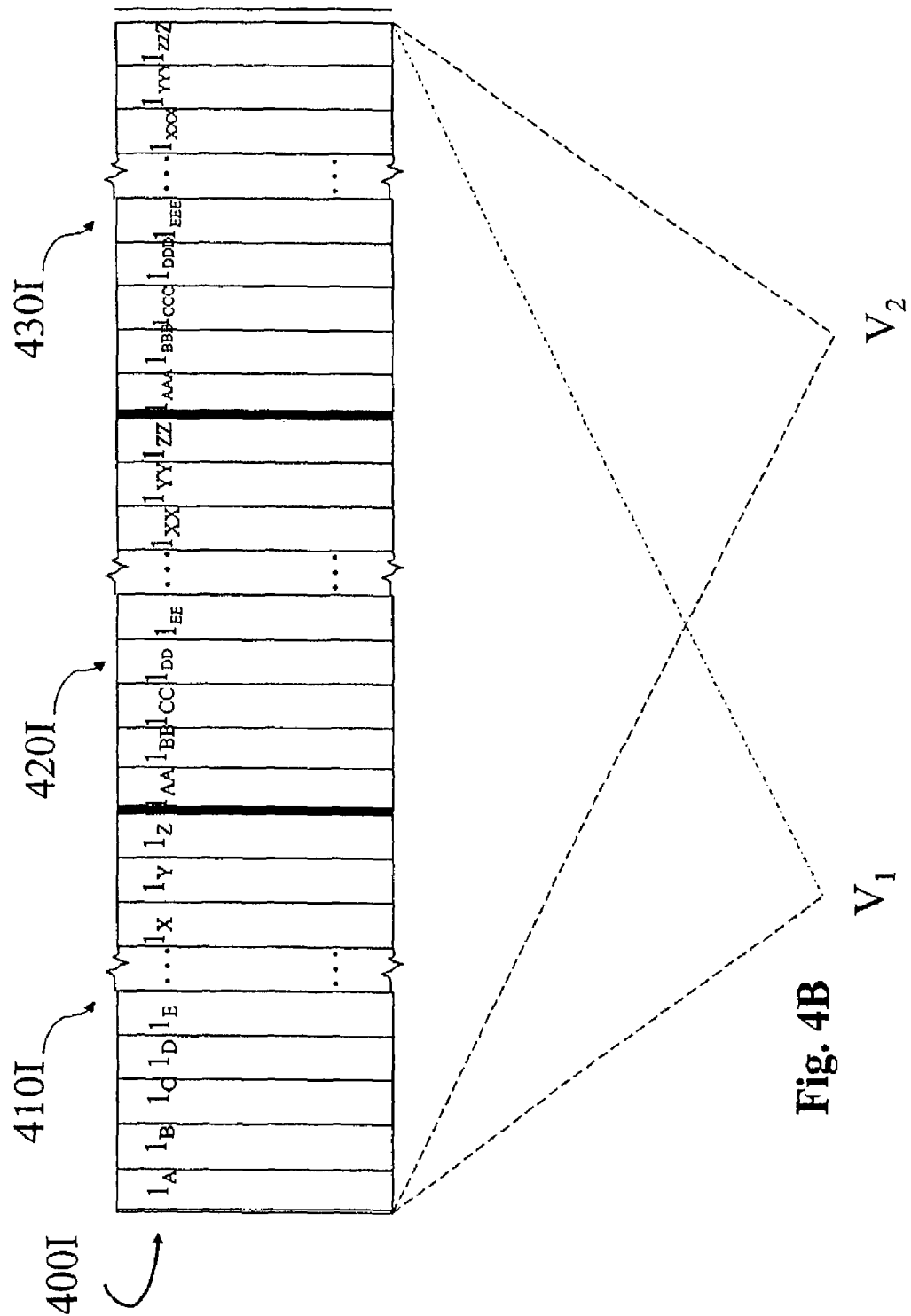
FIG. 4B is a diagrammatic representation of a three-panel display similar to that of FIG. 4A, showing what would be viewed in accordance with the present invention (400I).

FIG. 4A is a representation of a three-panel autostereoscopic lenticular display 400P configured in accordance with the prior art. FIG. 4B represents such a display 400I as configured in accordance with the present invention.

In the prior art configuration 400P, an observer at view point $V_1$ would see an image 1 in panel 410P, but a different image 3 in the adjacent second panel 420P and yet a different image 6 in the third panel 430P.

However, in accordance with the present invention 400I, an observer at view point $V_1$ would see an image 1 in panel 410I, a continuation of that same image 1 in panel 420I, and a further continuation of that same image 1 in panel 430I. This is because the image medium of panel 420I in the configuration of FIG. 4B would be offset by an appropriate number of interlaced elements from the sequence of panel 410I. Here that appropriate offset is by 2 image elements. Moreover, the image medium of panel 430I would be offset by an appropriate amount, here three additional interlaced elements from the sequence of panel 420I.

Of course an observer at view point $V_2$ would see a different overall image in the panels 410I, 420I, 430I, but in accordance with the present invention, the offset provided in the interlaced elements would generally allow the observer at that different view point to perceive a single, unified image as well, albeit a different one of the set of multiple images.

As mentioned above, sometimes the appropriate amount of offset is not an integral number of widths of the interlaced element. The present invention contemplates offsetting or shifting the image on the media-bearing substrate, or the media-bearing substrate itself, with respect to the image-directing device to allow for such fractional differences.

The panels or tiles may abut each other or be separated from one another, so long as the image from a particular view point, such as view point $V_1$, is part of the same image when viewed on multiple panels. If the panels are separated from each other, the amount of actual separation shown in the viewed image across the panels may be made according to design choice. Thus the images may be separated by removing segments at the separation, simulating the manner that an outdoor scene is viewed through a trellis window, or by moving the images apart without removing segments. In any case the images are adjusted in order to present appropriate portions of the same image on two panels. The present invention allows this to be accomplished without the observer perceiving undesired shifts at the junctions when the observer is at any of various view points at the optimal viewing distance.

FIG. 5 is a view of a display 519 in accordance with the present invention. The display 519 consists of two adjacent panels 521, 522, with image-directing devices 531, 532, which may be parallax barriers, lenticular screens or other image-directing devices capable of separating image segments. Also depicted on FIG. 5 for descriptive purposes is a row 543 of viewing locations or view points individually numbered 551-562.

Image-directing devices 531, 532 such as lenticular lens screen 244 shown in FIG. 1 or parallax barrier screens are positioned in front of the panels 521, 522. Three images ①②and ③ are presented in this example. Each viewing location is marked with an encircled digit to identify the image viewed from that location, e.g. ① ② or ③. If an observer traverses along a path at the optimal viewing distance in front of the panels 521, 522, the view of the images displayed through the image-directing devices 531, 532 would change in the sequence ① ② ③ ① ② ③ ① ② ③ so that at view point 551, image ① is seen, at view point 552, image ② is seen, and so forth. As displayed via the image-directing devices 531, 532, the particular image being viewed changes as one moves laterally, so that an observer sees the image ① followed by image ② so on, each image being viewed successively while the observer traverses the total viewing angle 611 of the display 519.

For example, each of the different images may be a view of a particular scene from one of three vantage points, or the images may be from the same vantage point and be taken at three different times, or if desired the three images may optionally be unrelated to each other.

An observer at each of the view points 551-562 is presented with image data from the image media 521, 522 via the image-directing devices 531, 532. View lines 571-582 represent the light paths from a particular lenticule 536 on image-directing device 531 to each of the view points 543. View lines 591-593 represent light paths from a particular lenticule 539 to the viewing locations 560-562. For clarity of illustration, the corresponding light paths from that lenticule to other view points are not shown. Light path 601 represents a light path from a lenticule 537 to a view point 554. For clarity of illustration, the corresponding light paths from that lenticule to other view points are not shown. Light path 602 represents a light path from a lenticule 538 to view point 554. For clarity of illustration, corresponding light paths from that lenticule to other view points are not shown. Light path 603 represents a light path from a lenticule 539 to view point 554. For clarity of illustration, corresponding light paths from that lenticule to other view points are not shown.

In accordance with the invention, an observer at view point 554 would see an overall image ① which incorporates image segments presented by lenticules 536, 537, 538, and 539, via the light paths 574, 601, 602, and 603 (illustrated for purpose of example) as well as by non-illustrated light paths from each of the other lenticules across the left and right panels 521, 522. The left half of the image ① would be viewed on the left panel 521, while the right half of the image ① would be viewed on the right panel 522.

Similarly, an observer at view point 551 would also see the same image, image ①. An observer angularly displaced to the right of view point 551, to view point 552, would see a different image, namely image ②. An observer further displaced from view point 551 to view point 553 would see yet another image, namely image ③.

An observer even further displaced from view point 551 to the aforementioned view point 554 would see image ①, the same image as seen at view point 551. This beginning of repetition indicates that the total viewing angle has been subtended by the displacement from view point 551 to view point 554.

Similarly, a observer at view point 557, displaced from view point 554 by the same amount as the aforesaid total viewing angle, would also see image ①, demonstrating that the displacement from view point 554 is the repeated total viewing angle.

As illustrated, an observer at view point 560 would see the left portion of image ① on panel 521 and the right portion of image ① on panel 522. This is in contrast to the prior art unadjusted configuration illustrated in FIG. 4A for example. Contrary to the present invention, in that situation, an observer at a view point corresponding to view point 560 would see, for example, the left portion of image ① on display 521 and the right portion of image ② on display 522.

When an observer views panel 521 from a first view point 551, an image corresponding to the totality of image segments making up the left half of image ① is seen. When the observer views panel 521 from a second view point 552, an image corresponding to the totality of image segments making up the left half of image ② is seen. According to the present invention, the image segments for the two panels 521, 522 are adjusted with respect to the image-directing devices 531, 532 so that, when viewed through the image-directing devices 531, 532 from any given view point within the intended range of optimal viewing positions 543, the left and right halves of the same image appear on the left and right viewing panels 521, 522, respectively.

Figure 6:
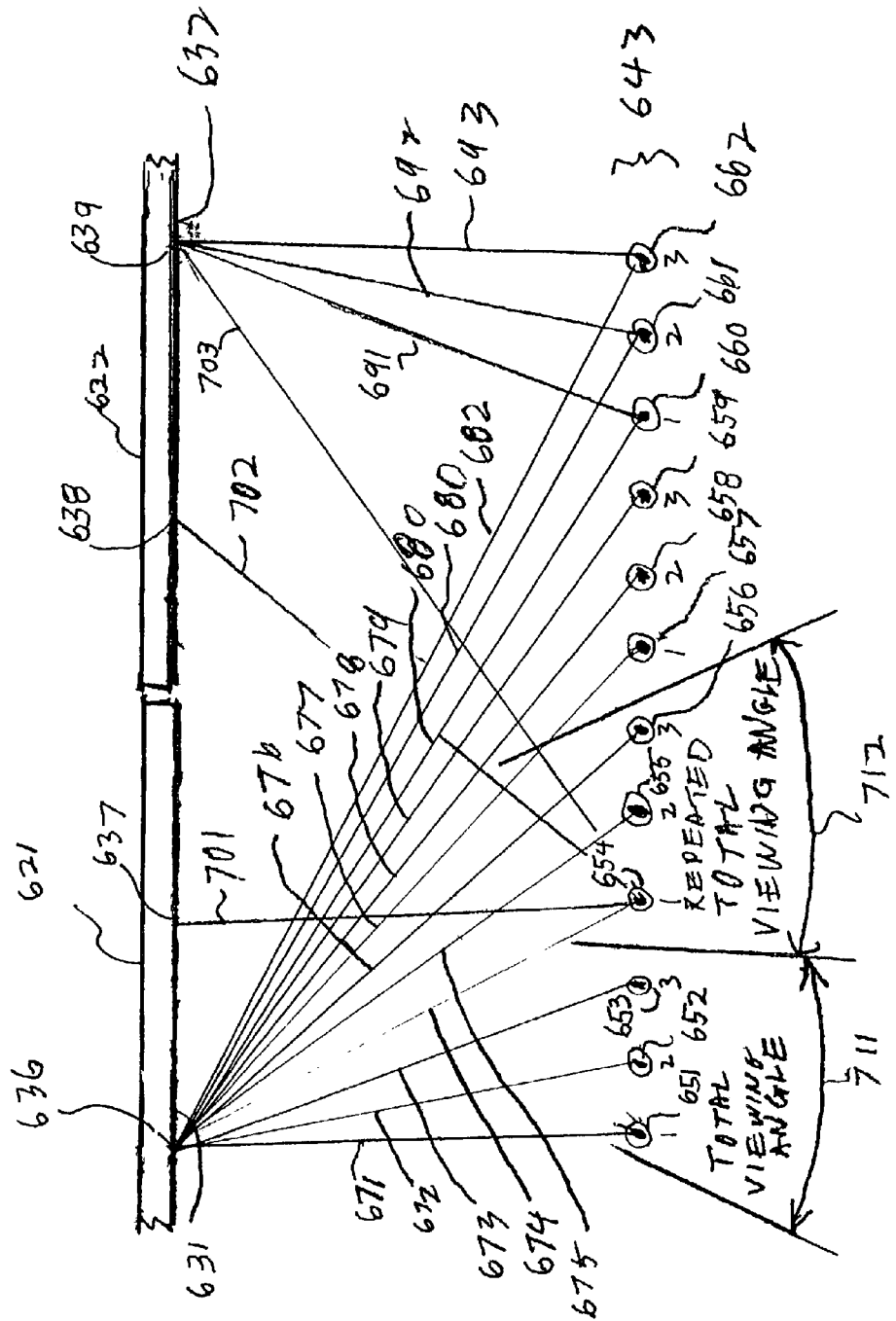
FIG. 6 is a diagrammatic view in the nature of FIG. 5, showing a display consisting of two adjacent panels using parallax barrier image-directing devices.

FIG. 6 depicts the invention implemented with a parallax barrier display. In its representation, FIG. 6 is similar to FIG. 5, in that the display 619 consists of two adjacent panels 621, 622, with parallax barrier image-directing devices 631, 632. Images ① ② and ③ are again presented in this example. Also depicted on FIG. 6 for descriptive purposes is a row 643 of viewing locations or view points individually numbered 651-662, similar to row 543 shown in FIG. 5. Images ① ② and ③ are viewed by looking at the panels 621, 622 through parallax barriers 631, 632. While two parallax barriers 631, 632 are depicted, it is possible to use a single parallax barrier for both panels 621, 622.

The parallax barrier image-directing devices 631, 632 are positioned in front of the panels 621, 622. Three images ① ② and ③ are presented in this example, in a manner similar to the description of FIG. 5, and each viewing location or point is marked with an encircled digit to identify the image viewed from that location, e.g. ① ② or ③. If an observer traverses along a path at the optimal viewing distance in front of the panels 621, 622, the view of the images displayed through the image-directing devices 631, 632 would change in the sequence ①②③③①②③① ②③ so that at view point 651, image ① is seen, at view point 652, image ② is seen, and so forth. As displayed via the parallax barrier image-directing devices 631, 632, the particular image being viewed changes as one moves laterally, so that an observer sees the image ① followed by image ② so on, each image being viewed successively while the observer traverses the total viewing angle 711 of the display 619.

An observer at each of the view points 651-662 is presented with image data from the image media 621, 622 via the parallax barrier image-directing devices 631, 632. View lines 671-682 represent the light paths from a particular slit 636 on image-directing device 631 to each of the view points 643. View lines 691-693 represent light paths from a particular slit 639 to the view points 660-662. For clarity of illustration, the corresponding light paths from that slit to other view points are not shown. Light path 701 represents a light path from a slit 637 to a view point 654. For clarity of illustration, the corresponding light paths from that slit to other view points are not shown. Light path 702 represents a light path from a slit 638 to view point 654. For clarity of illustration, corresponding light paths from that slit to other view points are not shown. Light path 703 represents a light path from a slit 639 to view point 654. For clarity of illustration, corresponding light paths from that slit to other view points are not shown.

In accordance with the invention, an observer at view point 654 would see an overall image ① which incorporates image segments presented by slits 636, 637, 638, and 639, via the light paths 674, 701, 702, and 703 (illustrated for purpose of example) as well as by non-illustrated light paths from each of the other slits across the left and right panels 621, 622. The left half of the image ① would be viewed on the left panel 621, while the right half of the image ① would be viewed on the right panel 622. Similarly, an observer at view point 651 would also see the same image, image ①. An observer angularly displaced to the right of view point 651, to view point 652, would see a different image, namely image ②. An observer further displaced from view point 651 to view point 653 would see yet another image, namely image ③. An observer even further displaced from view point 651 to the aforementioned view point 654 would see image ①, the same image as seen at view point 651. This beginning of repetition indicates that the total viewing angle has been subtended by the displacement from view point 651 to view point 654. Similarly, a observer at view point 657, displaced from view point 654 by the same amount as the aforesaid total viewing angle, would also see image ①, demonstrating that the displacement from view point 654 is the repeated total viewing angle.

As illustrated, an observer at view point 660 would see the left portion of image ① on panel 621 and the right portion of image ① on panel 622. This is in contrast to the prior art unadjusted configuration illustrated in FIG. 4A for example. Contrary to the present invention, in that situation, an observer at a view point corresponding to view point 660 would see, for example, the left portion of image ① on display 621 and the right portion of image ② on display 622.

When an observer views panel 621 from a first view point 651, an image corresponding to the totality of image segments making up the left half of image ① is seen. When the observer views panel 621 from a second view point 652, an image corresponding to the totality of image segments making up the left half of image ② is seen. According to the present invention, the image segments for the two panels 621, 622 are adjusted with respect to the parallax barrier image-directing devices 631, 632 so that, when viewed through the image-directing devices 631, 632 from any given view point within the intended range of optimal viewing locations 643, the left and right halves of the same image appear on the left and right viewing panels 621, 622, respectively.

Having thus described the invention, what it is desired to claim and thereby protect by Letters Patent is:

1. A method of making a tiled display of at least two panels, presenting an appearance of one image spanning all of the panels when observed from a given viewing position, each panel having an interlaced composite image to be viewed through an image-directing device attached thereto, comprising the steps of:

(a) choosing how many panels are to form the tiled display, the number of panels being P, P being at least 2;

(b) providing a plurality of images, the number of images being X, consisting of at least two different images, (c) dividing each image of said X images into P portions and forming from the X images P sets of portions, a first of said sets of portions containing a first portion of each of said X images, a second of said sets of portions containing a second portion of each of said X images, and so on respectively for each of the P sets of portions; each of said sets of portions to be displayed on a different panel, the first of said sets of portions from each of the said images to be displayed on the first of said panels, the second of said sets of portions from each of the said images to be displayed on the second of said panels, and so on respectively for each of the P sets of portions, (d) subdividing each said portion of each said image into segments, each segment containing visual image data from said portion of said image, such that the first portions of each of the said images are subdivided into the same number of segments as each other, the second portions of each of the said images are subdivided into the same number of segments as each other, and so on for all P portions, (e) forming a composite image for the first panel from the first portions of each of the said images by:

(i) selecting an order for the images which make up the said plurality of images, (ii) taking the first segment from the first portion of the first said selected image and placing it into the composite image, (iii) taking the first segment from the first portion of the second said selected image and placing it into the composite image adjacent to the segment placed there in step (e)(ii), (iv) whenever the total number of images X is greater than two, taking the first segment from the first portion of the third to X-th said selected image and placing it into the composite image adjacent to the segment placed there by the preceding placement analogously to what was done in step (e)(iii) until the composite image contains a segment from each of the images in the said plurality of X images, the segments so placed into the composite image constituting a set of segments, (v) performing steps analogous to steps (e)(ii)-(iv) but utilizing the second segment from each of the plurality of images to form an adjacent set of segments in the order defined in step (e)(i), and so on for as many segments as the first portion of each of the images is divided into, (f) performing steps analogous to steps (e)(ii)-(e)(v) for every other of the P portions of each of the said images, thereby forming P composite images, each of said P composite images containing sets of segments from a portion of each of said plurality of images, and (g) providing P display panels adjacent to each other, each said panel comprising an image medium on which a composite image is to be displayed and an image-directing device to be attached to said image medium, each said image-directing device comprising a multiplicity of image-directing elements, wherein the number of image-directing elements on each said image-directing device on each said panel is the same as the number of said sets of segments to be displayed on the said image medium of each said panel that the said image-directing device is to be attached to, (h) displaying each said composite image on one of the said display panels, and (i) attaching said image-directing device to the first of the display panels so that each image-directing element thereof is positioned in front of one of said sets of segments, and then (j) displacing the image-directing device to be placed in front of the second of the display panels with respect to the composite image on said second of the display panels so that, from a given viewing position at which the first portion of the first image is visible to at least one eye of an observer viewing the first panel, the second portion of the first image is simultaneously visible to the same said at least one eye of the observer on the second panel, and (k) for any third to the P-th of the said display panels, successively displacing each image-directing device to be placed in front of each display panel with respect to the composite image on each of the said third to the said P-th of the display panels so that, from a given viewing position at which the first portion of the first image is visible to at least one eye of an observer viewing the first panel, the third portion of the first image is simultaneously visible to the same said at least one eye of the observer on the third panel and every other portion of the first image is simultaneously visible to the same said at least one eye of the observer on the corresponding other panel or panels.

2. The method of claim 1, wherein the segments are arranged as interlaced stripes.

3. The method of claim 2, wherein the interlaced stripes are vertical and each image-directing device is a lenticular lens having lenticules arranged vertically.

4. The method of claim 1 wherein at least one of the image-directing devices comprises image-directing elements having parallax barriers.

5. The method of claim 1 wherein the segments are arranged on the image plane of the panels optically by projecting the images through an interlacing element and wherein the order of projection of the images is different for each panel.

6. The method of claim 5 wherein the interlacing element is a lenticular lens.

7. The method of claim 5 wherein the interlacing element is a barrier screen.

8. The method of claim 1 wherein the segments are arranged on the image plane of the panels by interlacing the images in a computer and the order of the segments resulting from the interlacing is intentionally different from one panel to the next.

9. The method of claim 1, wherein the initial images are selected from the group consisting of: different views of a scene and different frames of a movie, video, animated sequence or multiple image presentation.

10. The method of claim 1, wherein at least one image-directing device is a lenticular lens.

11. The method of claim 1 wherein the segments are arranged on the image plane of the panels optically by projecting the images through an interlacing element wherein the images are projected onto the first panel at different angles than they are projected onto a subsequent panel.

12. The method of claim 1 wherein the panels are separated from one another.

13. The method of claim 12, wherein the panels are separated by physically removing segments at the separation, giving the impression that the scene is viewed as if it is being seen through a trellis window.

14. The method of claim 12, wherein the panels are moved apart without removing segments.

* * * * *